J. BURGUN.
MANUFACTURE OF HOLLOW GLASSWARE.

No. 186,986. Patented Feb. 6, 1877.

UNITED STATES PATENT OFFICE.

JOSEPH BURGUN, OF PITTSBURG, PENNSYLVANIA, ASSIGNOR TO DITHRIDGE & CO., OF SAME PLACE.

IMPROVEMENT IN THE MANUFACTURE OF HOLLOW GLASSWARE.

Specification forming part of Letters Patent No. 186,986, dated February 6, 1877; application filed January 18, 1877.

*To all whom it may concern:*

Be it known that I, JOSEPH BURGUN, of Pittsburg, in the county of Allegheny and State of Pennsylvania, have invented a new and useful Improvement in the Manufacture of Hollow Glassware; and I do hereby declare the following to be a full, clear, and exact description thereof, reference being had to the accompanying drawing, forming a part of this specification, in which—

Figure 1:
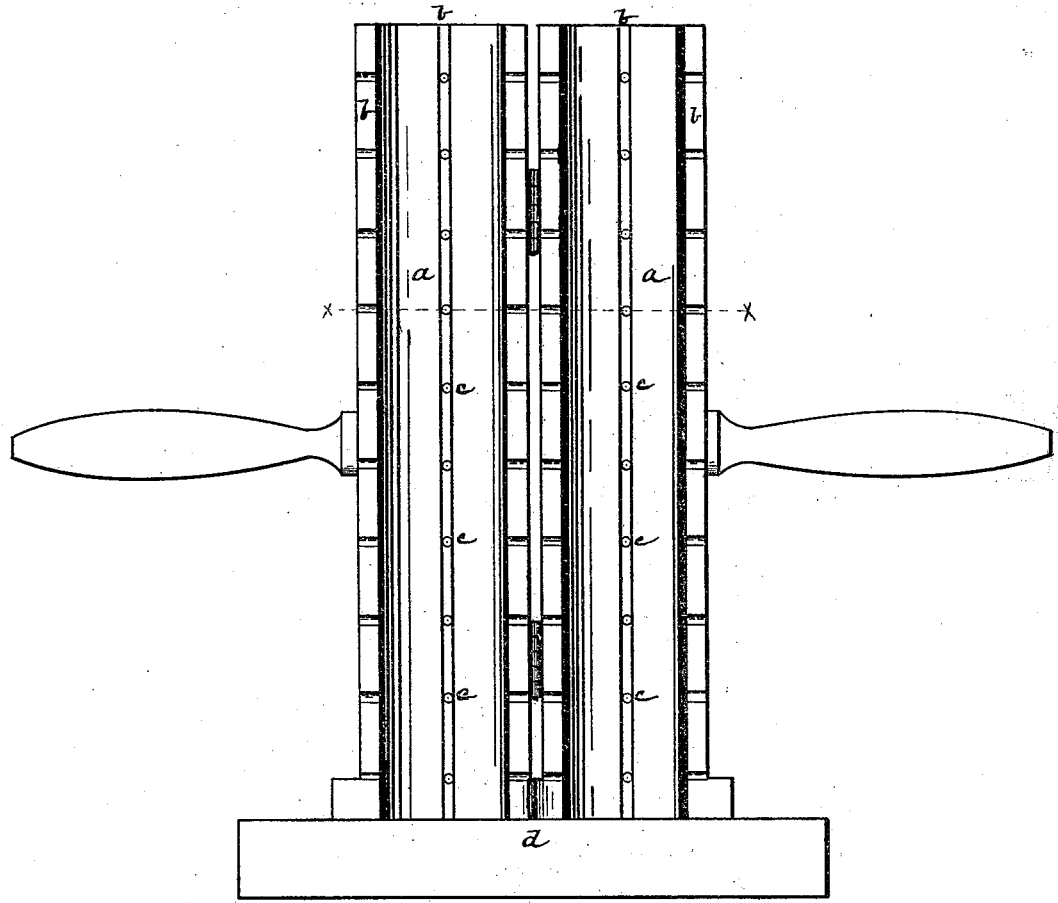
Figure 2:
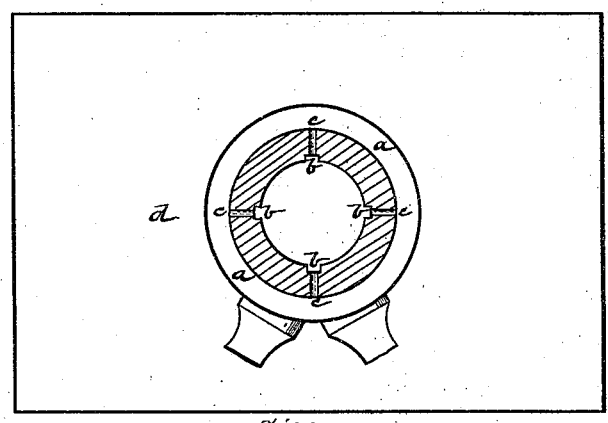

Figure 1 is an elevation of a two-part or hinged mold, such as is used in practicing my invention, it being shown as open. Fig. 2 is a transverse section of the same mold when closed.

Like letters of reference indicate like parts in each.

Lamp-chimneys, tubes, and other articles of hollow glassware, round in cross-section, and having a plain external surface, have been made in metal molds by rotating the article while it is being blown. The molds are coated internally by compositions of various kinds, well known to glass-manufacturers, to keep the article from sticking. The object of rotating the article is to wipe out the mold-marks, and to impart a surface-finish to it.

My invention relates to an improvement in the use and construction of molds of this class, in which the article is rotated within the mold, or, which is the same thing in effect, in which the mold is rotated around the article while it is being blown, consisting in blowing the article within a grooved mold, either article or mold being rotated. The effect of this operation is to free rotating surface, whether of the article or mold, from continuous contact with the other, and to cause the surface of the article to encounter a series of polishing-surfaces, and thereby relieve it of the tendency of the mold to draw the glass and spoil the surface-finish. These molds are provided with a number of holes in the sides, to permit the escape of the heated gases; and in my mold I place these holes in the grooves, which, passing over the surface of the glass, take up and form channels of escape for the gases equally over the whole surface, and thereby prevent them from acting injuriously by reason of being confined between the glass and the mold.

The result of my invention is the production of glass of great beauty, and of the most brilliant finish. The mold is provided with one or more longitudinal grooves, channels, or depressions, and these may be straight from end to end, or they may run spirally around the inside, or they may be zigzag, or of other form; but in all cases they must extend in the direction of the axis of rotation, so that no given point in any one groove shall travel over the surface of the glass in the same plane as any other point.

The article made must be round in cross-section, so as to turn in the mold; but it is not necessarily of the same diameter throughout its length.

The drawing shows a cylindrical mold, *a*, having longitudinal grooves *b* and holes *c*, which are for the escape of the gases. The mold is placed and used on a bottom plate, *d*.

The operation is as follows: The mold *a* being properly coated, the workman gathers the proper amount of glass upon his pipe and blows it in the mold, rotating the pipe between his hands while he blows. When a rotating mold is used the pipe is not rotated. The construction of rotating devices for rotating molds is well known.

The number of grooves in the mold is not a material matter. One groove will produce good results, but I prefer to use four.

What I claim as my invention, and desire to secure by Letters Patent, is—

As an improvement in the manufacture of hollow blown glassware, blowing the same in a mold grooved longitudinally, while either the glass or the mold is rotated.

In testimony whereof I, the said JOSEPH BURGUN, have hereunto set my hand.

JOSEPH BURGUN.

Witnesses:
JAMES I. KAY,
T. B. KERR.